(12) United States Patent
Reinhard

(10) Patent No.: US 6,450,944 B1
(45) Date of Patent: Sep. 17, 2002

(54) ACCELERATION PROTECTIVE SUIT

(75) Inventor: Andreas Reinhard, Zollikon (CH)

(73) Assignee: LSS Life Support Systems AG, Zollikon (CH)

( * ) Notice: Subject to any disclaimer, the term of this patent is extended or adjusted under 35 U.S.C. 154(b) by 0 days.

(21) Appl. No.: 09/446,443

(22) PCT Filed: Apr. 23, 1998

(86) PCT No.: PCT/CH98/00161

§ 371 (c)(1), (2), (4) Date: Apr. 26, 2000

(87) PCT Pub. No.: WO99/54201

PCT Pub. Date: Oct. 28, 1999

(30) Foreign Application Priority Data

Apr. 20, 1998 (CH) ................................. 901/98

(51) Int. Cl.[7] ............................................... B64D 10/00
(52) U.S. Cl. ........................................................ 600/20
(58) Field of Search ....................................... 600/19–20

(56) References Cited

U.S. PATENT DOCUMENTS

| | | | |
|---|---|---|---|
| 2,228,115 A | 1/1941 | Holste | 600/20 |
| 3,523,301 A | 8/1970 | Davis et al. | 200/21 |

FOREIGN PATENT DOCUMENTS

| | | |
|---|---|---|
| EP | 0348835 | 1/1990 |
| FR | 2581964 | 5/1985 |
| GB | 959350 | 5/1964 |
| WO | WO 913278 | 3/1991 |
| WO | WO 99/54200 | 10/1999 |
| WO | WO 99/54202 | 10/1999 |
| WO | WO 99/54203 | 10/1999 |

*Primary Examiner*—John P. Lacyk
(74) *Attorney, Agent, or Firm*—Jenkens & Gilchrist, P.C.

(57) ABSTRACT

The suit according to the invention comprises, as well as a textile lining and a skin made of low stretch textile material, a double walled skin lying between them, made of moderately stretchable watertight material. The latter is made of walls, which are joined together at connection positions for instance by welding. The mutually communicating hollow spaces arising thereby in the double walled skin are filled with a fluid. The suit is closed by zip fasteners (17, 19) and by shoulder straps (18). Short zip fasteners (26) in the crotch facilitate putting on the suit. The front part (20), armlets (21) thorax part (24) can be equipped with various structures of connecting positions, which however are arranged similarly on both halves of the suit. All the named parts (20, 21, 24) can be provided each with two valves (22, 23) for filling with the fluid and for ventilation. The fluid filled and pretensioned, by the outer skin, double walled skin builds up a compensating pressure on the body proportional to the acceleration.

35 Claims, 6 Drawing Sheets

Figure 1:
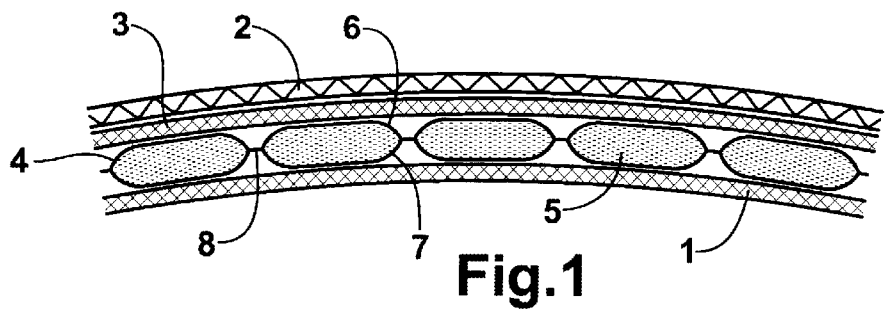

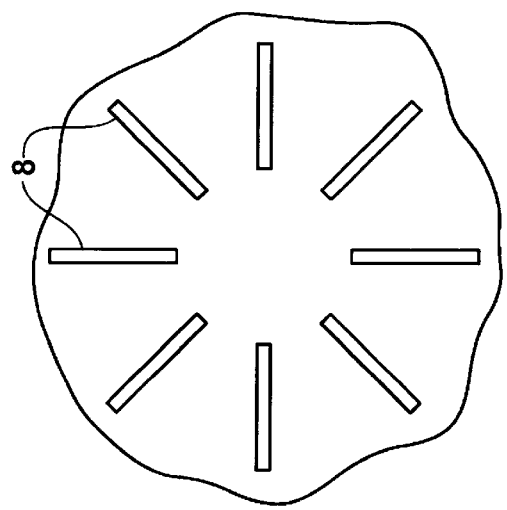
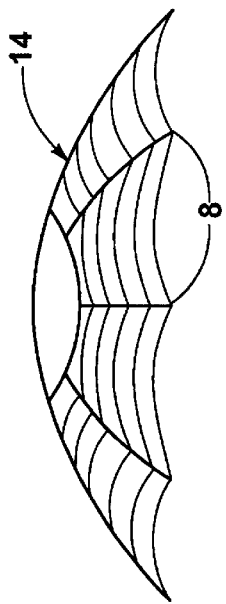
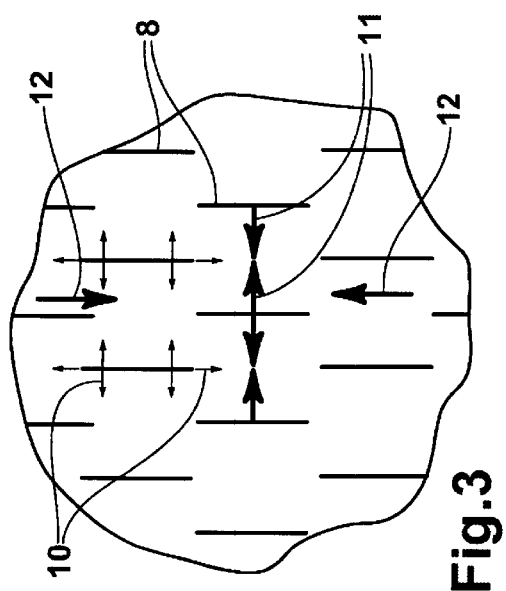
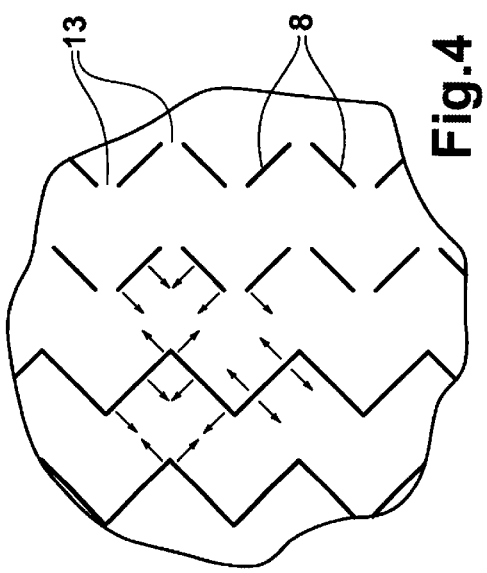

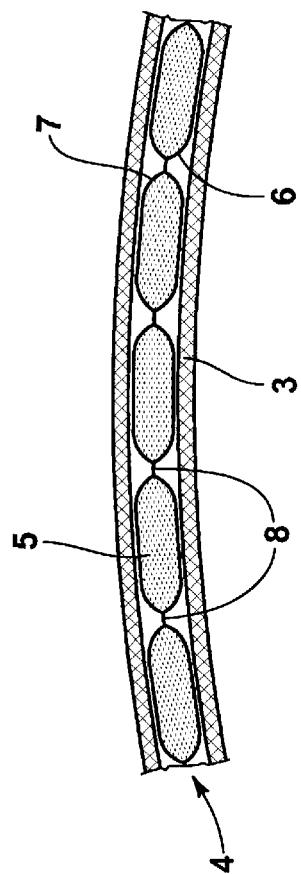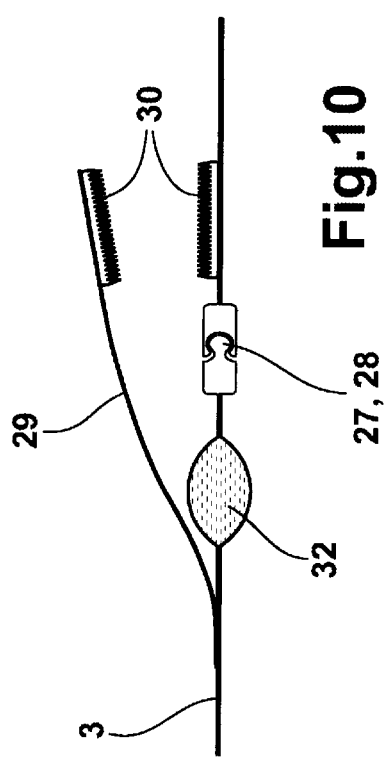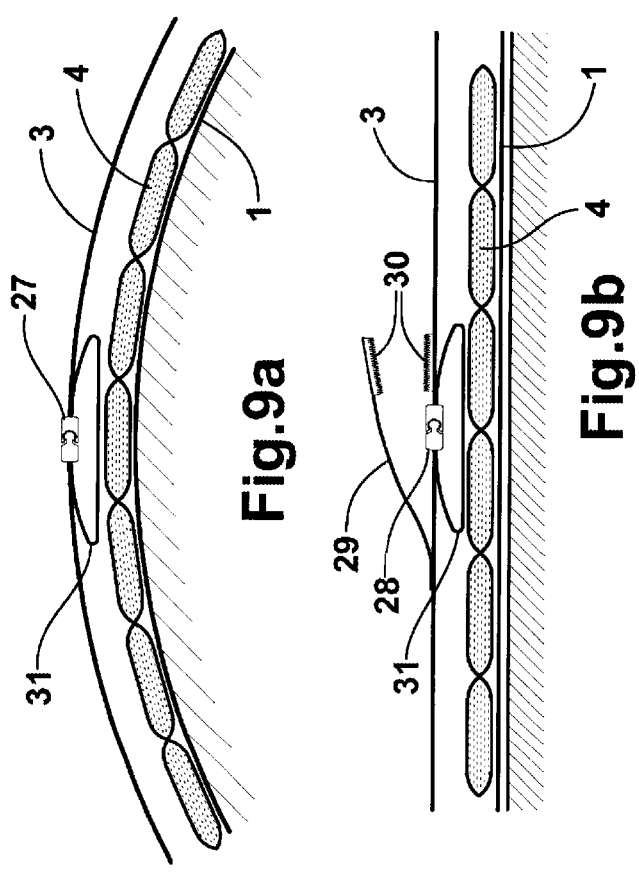

ACCELERATION PROTECTIVE SUIT

The present invention relates to a suit for protection against the effects of acceleration, such as arise in high performance aircraft when flying in curves, in accordance with the preamble to claim 1.

Many such protective suits have become known. Those nearest to this invention work on the pressure principle: the body of the pilot—or in the case of multi-seat aircraft naturally the other flying personnel also—is surrounded by a liquid-carrying double layer. The acceleration forces operating on the body's own fluids, predominantly the blood, affect the liquid present in the protective suit in equal measure. Thereby pressure forces are built up on the surface of the body, which correspond to those, which work on the skin from the body fluid. Such a suit is known from EP 0 376 027 B1 (D1). This known conversion from D1 requires a relatively large volume of liquid, which is held together on the outside by a low elasticity suit. Although the pilot's body is now released from the pressures on blood vessels, internal organs and skin, on the other hand his body—the skeleton and static musculature—is additionally loaded to a substantial degree by the weight, multiplied by the acceleration factor of the mass of water carried, which necessitates the application of a supporting corset to remove the loading on the spinal column. Furthermore the application of the protective suit according to D1 has the consequence that the pilot cannot climb into nor leave the aircraft without outside help. The water or general fluid filling can only take place in the aircraft. An emergency exit by means of an ejector seat is inconceivable. Dressing with this quoted protective suit also requires intensive outside assistance.

A further protective suit is known from U.S. Pat. No. 5,153,938 (D2), which essentially builds on the pressure principle. An inner suit, which however leaves large parts of the body uncovered, comprises liquid filled flat bladders. An outer suit, to be worn over it, is essentially inelastic and holds the whole ensemble together. The pressure built up by the bladders is transmitted by the outer suit to the parts of the body unprotected by the inner suit.

Although here by dispensing with the covering of the whole body by the inner suit substantial fluid—and therewith mass and weight—can be saved, the suit claimed in D2 is still heavy. In order to reduce the weight further and to improve freedom of movement, in D2 pressure compensation on the arms is completely dispensed with. It is replaced by elastic armlets; their compensating effect is only so far acceleration dependent, as the volumes of the arms increases with the additional acceleration forces on the blood, and thereby the elastic material of the armlets is additionally tensioned increased.

A further protective suit on the pure pressure principle is known from CH 687 573 (D3), which however is made in one part, in so far as the unyielding outer skin forms the outer suit. Here also a disadvantage exists in the high weight of the protective suit.

The aim, which is to be addressed by the present invention, comprises the production of a suit for protection against the effects of the acceleration forces, which arise in curved flight in high performance aircraft, predominantly in the instantaneous and local Z-axis, furthermore the protective suit to be produced should be lighter than those previously known, should make it possible that it can be put on and taken off by the wearer without help and enable him to climb into and leave the aircraft without help and permit the wearer generally to have normal mobility outside the aircraft.

The addressing of the stated aim is given in Claim 1 with respect to its essential features, in the further Claims with respect to further advantageous developments.

Figure 8:
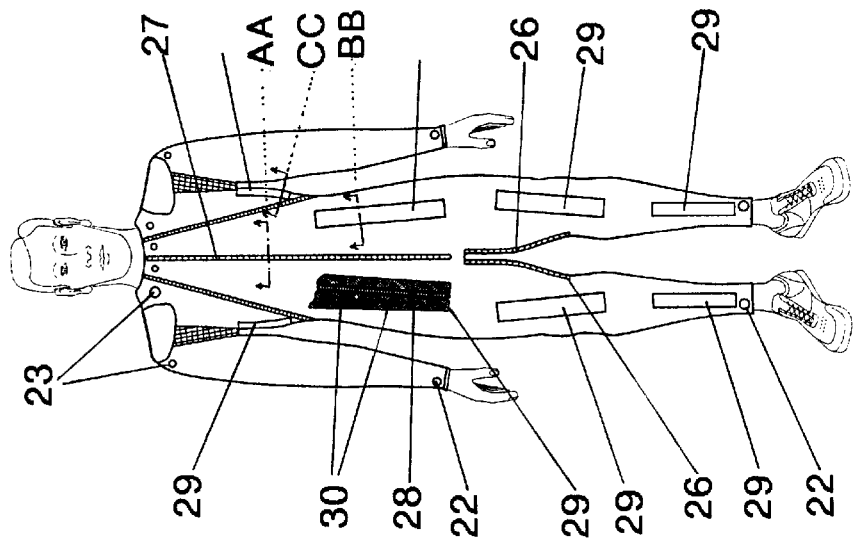
Figure 7:
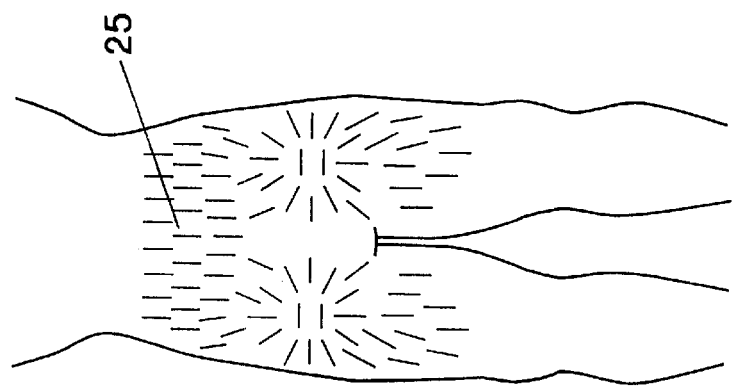
Figure 6:
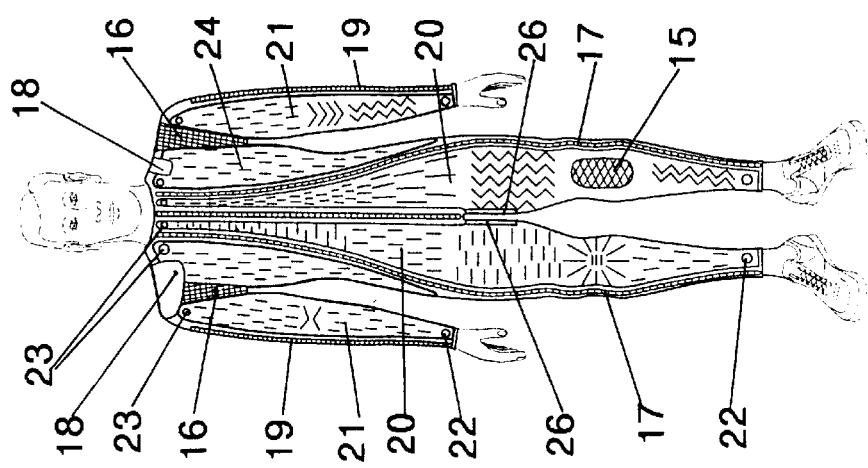
Figure 12:
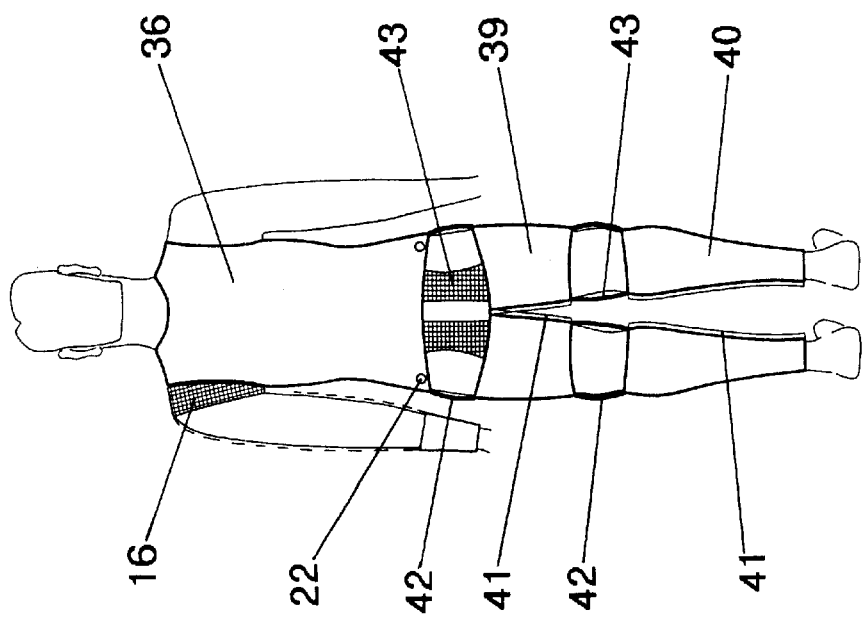
Figure 11:
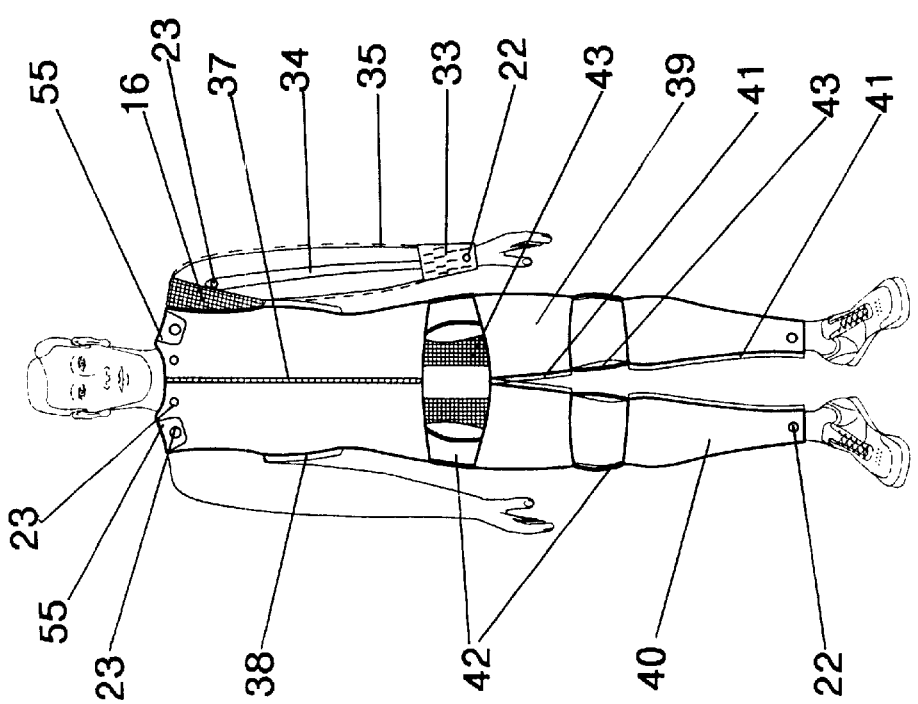
Figure 13:
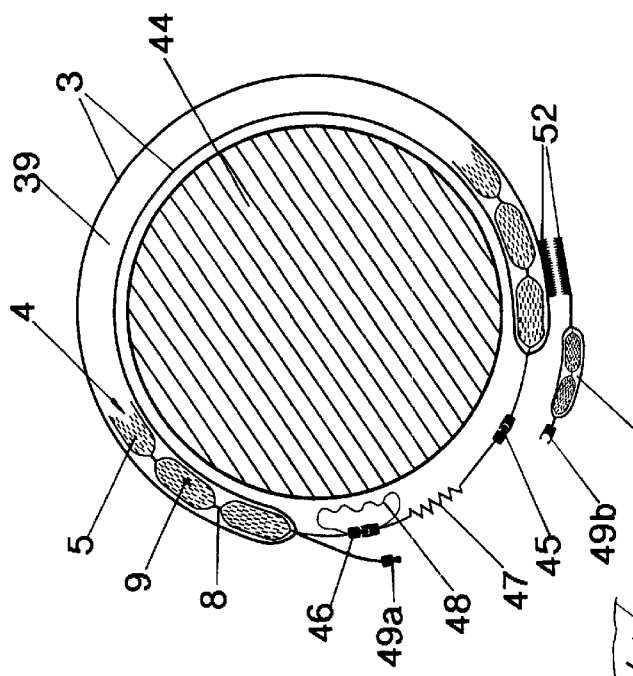
Figure 13:
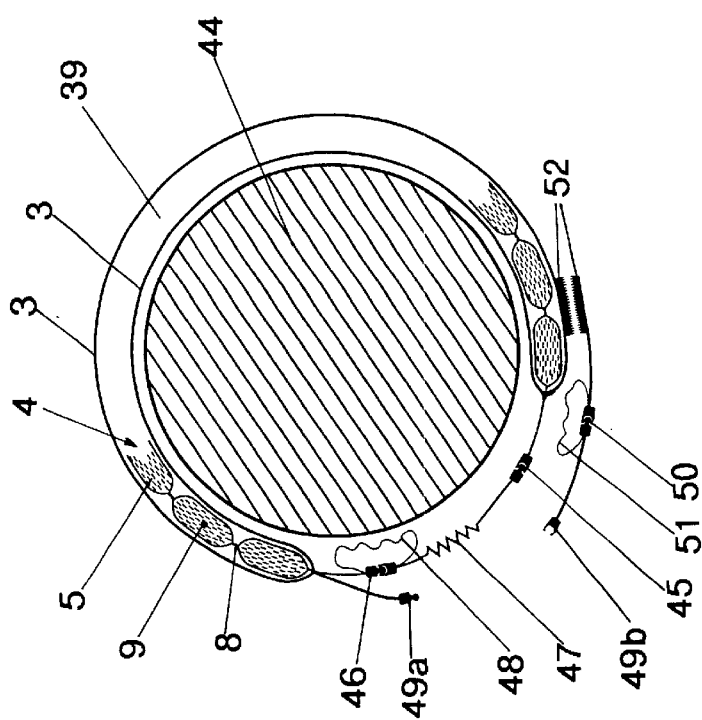
Figure 15:
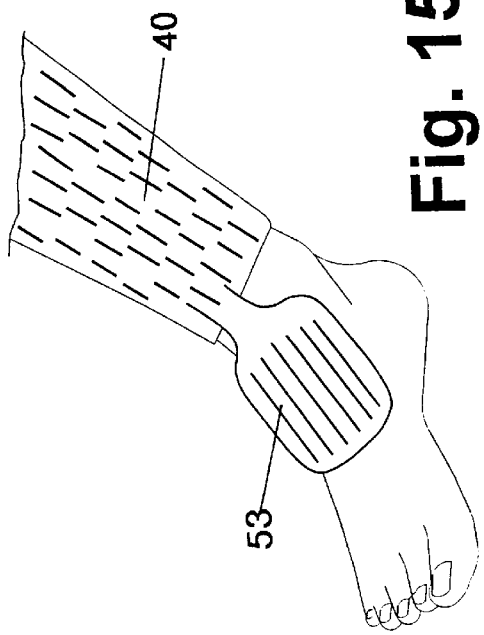

The idea of the invention is more closely explained using the attached drawing. Shown are:

FIG. 1 a cross section through a build up of the layers of the protective suit,

FIG. 2 a plan view b a first section c a second section d a third section through a first arrangement of connection positions, FIG. 3 a second arrangement of connection positions, FIG. 4 a third arrangement of connection positions, FIG. 5 a a plan view b a side elevation of a fourth arrangement of connection positions, FIG. 6 a front elevation of a first example of construction of the protective suit in two modifications, FIG. 7 a detail from the rear view of the first example of construction, FIG. 8 a front view of the outer of the example of construction from FIG. 6, FIG. 9a a cross section through a first example of construction of a closure device, FIG. 9b a cross section through a second example of construction of a closure device, FIG. 9c a cross section through a modification of FIG. 9b, FIG. 10 a cross section through a third example of construction of a closure device, FIG. 11 a front view of a second example of construction of the protective suit, FIG. 12 the rear view of FIG. 11, FIG. 13 a a cross section through a fourth example of construction of a closure device, b a cross section through a fifth example of construction of a closure device, FIG. 14 a modification of FIG. 1, FIG. 15 a perspective view of a detail according to the invention.

The protective suit according to the invention is basically an intermediate piece of clothing between the underwear covering the limbs and the body or a special lining 1, on the one side, and a normal flying combination suit 2 on the other side. Enclosed in a skin 3, made of inelastic material, shown in more detail in the following Figures, is a structured double walled constructed, liquid-filled skin 4, which covers large parts of the body of the flyer.

FIG. 1 shows a part of a schematic cross section through this construction.

The double walled skin 4 can comprise limited elasticity, or inelastic and armoured plastics material. It has an outer wall 6 and an inner wall 7, which are joined together at connection positions 8 and thus cause hollow spaces 5 to arise, which are filled with a fluid 9. The fluid 9 can be for instance water, possibly with additives, which affect its fluidity and or density.

Figure 2A:
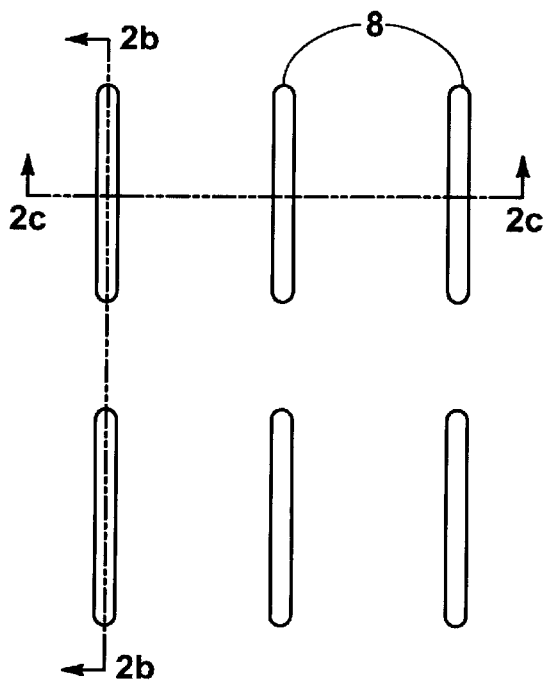

FIGS. 2a, b, c, d show in detail views the attachment of connection positions 8 to the walls 6, 7. These connection positions can be produced by welding, gluing or sewing. In FIG. 2a a field of, for instance, six connection positions 8 from a part of the protective suit, is shown schematically. Each individual connection position has the form of a long thin strip. A section AA according to FIG. 2b shows that the separation between the ends of the strip-formed connection positions 8 is shortened, as soon as the fluid 9 present in the hollow space 5 between the walls 6, 7 flows in and is put under pressure. The same applies to the sideways separation of the connection positions 8, as is shown in the section BB according to FIG. 2c.

Figure 2C:
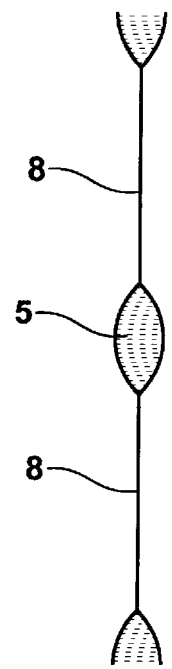
Figure 2B:
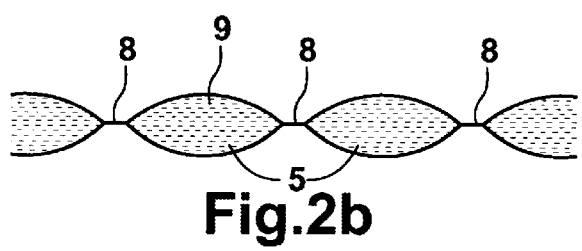
Figure 2D:
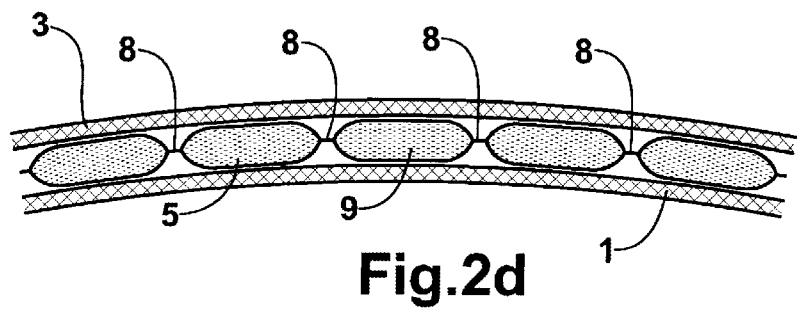

If now a formation of the walls 6, 7 lies around a body part, for instance a thigh, then there results, as is shown in FIG. 2d:

The hollow spaces 5 are inflated and the inner wall 7 lies against the thigh, the outer wall 6 lies against the inelastic outer skin 3, which builds up a tension force σ. Thus, in the hollow space 5 a pressure p rules, in the outer skin 3 the tension force σ, so that a certain pressure corresponds to a certain tension force. At positions which for constructional reasons cannot have any fluid-filled hollow spaces 5 (as shown later), the outer skin, lying immediately on the body, builds up the fluid pressure p corresponding to the tension force σ.

FIG. 3, 4, 5a, b show different arrangements of connection positions 8, which, when the fluid 9 inflates the hollow space 5, results in a completely predetermined deformation of the double-walled skin 4.

In FIG. 3 the connection positions 8 are arranged in parallel, displaced rows. By the application of pressure on the fluid 9, that is present in the hollow spaces 5 arising between the walls 6, 7, force effects arise on the connection positions 8 (small arrow 10 in FIG. 3). Thereby the construction existing between the walls 6, 7 shortens, preferably in the direction at right angles to the direction of the connection positions 8 (large arrow 11 in FIG. 3). To a less strong degree there arises however through this arrangement also a similar shortening in the direction of the linear connection positions 8 (large arrow 12). The fluid 9 present between the walls 6, 7 has great mobility in this arrangement; it can flow along as well as at right angles to the direction of the linear connection positions 8.

The arrangement according to FIG. 4 builds up, in contrast to that of FIG. 3, almost isotropic tensile forces, since due to the zig-zag pattern of the connection positions 8 the projections in both coordinate directions in the plane of the walls 6,7 are almost exactly great, or at least can be exactly great. Thereby an almost isotropic shrinkage of the sizes of the surface areas provided with connection positions 8 can be attained. The zig-zag shaped connection positions 8 in FIG. 4 can also show interruptions 13, as are shown in the right half of the illustration of FIG. 4. Thereby the intrinsically somewhat restricted mobility of the fluid 9 between the individual hollow spaces 5 is improved.

Instead of the depicted zig-zag pattern with sharp corners a formation with curves is also included in the scope of the invention; instead of a zig-zag pattern in the narrow sense, then, a wave-shaped one arises. All such configurations are included and are to be understood within this concept.

FIGS. 5a, b show the deformation under pressure of an arrangement of for instance eight linearly attached connecting positions 8 running radially. In FIG. 5a a plan view is shown, in FIG. 4b a side elevation, partly in section. Since the intervening spaces between the connection positions 8 shorten almost proportionately to the distance between homological points of two connection positions, the arrangement lifts from the level in the shape of a barrel and forms a basket 14.

Such an arrangement is preferably selected at points on the body, where curves have to be enclosed, such as elbows, knees, seat; arrangements according to FIG. 3 are preferably to be selected for more cylindrical or flat parts of the body.

FIG. 6 shows a first example of construction, in several modifications at the same time. The outer skin 3 is removed in these, whereby a free view is given of the structured double-walled skin 4.

Different modifications are shown regarding the structures of the connection positions 8. The surfaces carry structures according to FIG. 3, where flat or cylindrical body parts are rather to be enclosed, such as the thorax, arms or lower leg. As seen by the observer, the left thigh similarly carries structures according to FIG. 3, however in a cross running arrangement, so as not to permit any groin folds to arise.

The knee of the same leg carries a structure according to FIG. 5a, b; the other knee is not covered by the double-walled skin 4 and has for protection only an elastic insert 15. The remaining structures are arranged according to FIG. 4. Obviously the two halves of the body are constructed identically with regard to the structures employed. The arms are produced separately from the rest of the protective suit as regards the double-walled skin 4 and are joined to it in each case by an elastic insert 16.

A modification of this example of construction has no armlets, so that the protective suit ends at the elastic insert 16. The structured double-walled skin 4, shown in front elevation according to FIG. 6 is for instance fastened to the lining 1 by means of velcro fasteners or zip fasteners (not shown). The outer skin 3 has a zip fastener 17 extending over the whole length of the suit. Over the shoulders the protective suit has broad flaps 18, for instance provided with velcro fasteners. The flap 18 in the right hand side of the illustration is narrower for the armless version, that in the left-hand side of the illustration is made wider. Two short zip fasteners 26 are arranged in the crotch, which serve for the easier putting on of the protective suit.

The armlets of the protective suit are similarly provided with zip fasteners 19 over their entire length. The double-walled skin 4 comprises preferably several individual parts, which are joined to each other and/or to the lining 1 by means of zip or velcro fasteners. Each of these individual parts—for instance front part 20, armlet 21, thorax part 24—has an under and an upper valve 22, 23. These serve for filling and ventilating the individual parts quoted.

FIG. 7 shows the rear side of the example of construction according to FIG. 6. The back part designated by the reference 25 comprises also the back parts of the legs and can be connected for fluid circulation to the thorax part 24.

In the upper part the connection positions 8 run essentially vertical; the main direction of tension runs horizontally and effects an external pressure on the organs in the abdominal cavity. Its volume is thereby restricted; the blood cannot assemble there. This arrangement shown on the back is also continued at the front. The seat is covered by structures according to FIG. 5a, b, so that each half of the seat is held in independently by a hollow shape as shown there.

A zone connects below, in which the thighs especially are under a tensile pressure along the circumference.

FIG. 8 is a front view of the closed outer skin 3 of the protective suit. Here a further zip fastener 27 appears, whose method of operation is more closely shown in FIG. 9a. For instance six other zip fasteners 28 are covered by flaps 29 with velcro fasteners 30. These are explained more closely using FIG. 9b. Similarly there is a closure under each arm, which similarly is covered with a flap 29. Details of these can be seen in FIG. 9c.

The aim which is addressed by the closures mentioned, comprises the building up of the basic tension of the outer skin 3, which effects a basic pressure in the hollow spaces 5 and ensures that the fluid 9 is distributed over the whole length of the body, or suit. In this way the building in of reservoirs for the fluid 9 can be dispensed with.

The representations in FIG. 9a, b, c concern details of the tensioning arrangements of the outer skin 3 according to FIG. 8.

FIG. 9a shows the zip fastener 27 in the section AA. For clarity the lining 1, the double-walled skin 4 and the outer skin 3 are somewhat moved apart. The two parts of the zip fastener 27 are joined together by an insert 31, which comprises a light textile material. The body of the wearer is indicated by a light oblique shading.

The section BB in FIG. 8 is shown in FIG. 9b. This section applies for all six tensioning arrangements covered by flaps 29 in accordance with FIG. 8. Apart from the flap 29 which can be closed with the velcro fastener 30, the construction of the arrangement is as shown in FIG. 9a: The insert 31 is bridged by the closed zip fastener 27; the skins 3, 4 and the lining 1 are somewhat moved apart for reasons of illustration, the body of the wearer is indicated by an oblique shading.

The construction of the arrangement according to section CC in FIG. 8 corresponds to that of the section BB and is shown in FIG. 9c. Instead of a zip fastener a lacing is also in accord with the invention here. Then the width of the thorax part of the protective suit can be adjusted by the arrangement according to FIG. 9c.

A pneumatic tensioning device can be provided flanking the zip fasteners 27, 28, as shown schematically in FIG. 10. A structure element according to FIG. 3 is set into the outer skin 3, which extends at least over the whole length of the flanked zip fasteners 27, 28 and forms a long extended bladder 32. It can also have intervening connection positions 8 outside on the edge. Following the closure of the zip fastener 27,28 the bladder 32 is pumped up from the on-board compressed air system to a predetermined pressure, which is higher than the highest possible due to the effects of acceleration in the deepest lying fluid-filled structures, which surround the legs of the wearer. Thereby on the one hand the zip fasteners 27, 28 can be released from pressure on closure, on the other hand the necessary predetermined basic tension of the outer skin 3 is assured.

A second example of construction of a protective suit according to the invention is shown in FIG. 11 and FIG. 12.

FIG. 11 is a representation from the front, FIG. 12 of the same from the rear. The example of construction shown here leaves the arms, knees, seat and groin region uncovered; thus the upper body, with the abdominal region, upper and lower legs have pressure compensation. In addition it is possible, as shown in FIG. 11, 12 in the right-hand half of the illustration only, for the lower arm to be enclosed in a pressure sleeve 33, which has a long extended reservoir 34 on a non tensioned armlet 35. The pressure sleeve 33 and the reservoir 34 are, as are all the fluid bearing elements in FIG. 11, 12 provided with an upper and lower valve 22, 23. The armlet 35 is shown in dashed lines.

The upper body is enclosed in an upper part 36, which is closed by a simple zip fastener 37. Tensioning devices 38 for the outer skin 3 are arranged under the arms and are the subject of FIG. 10. The thighs are enclosed by thigh parts 39, the lower legs by lower leg parts 40. Their closure and tensioning devices 41 are shown in FIGS. 13 a, b.

The upper part 36, the thigh and lower leg parts 39, 40 form a single system hydraulically.

These are united in the vertical direction by double-walled skins 4 in the form of connecting elements 42. Further, elastic textile bands 43 are provided, to assure the fit and integrity of the protective suit.

The upper part 36 is closed by two wide straps 55 over the shoulders, which similarly include double walled skins and assume the function of reservoirs in this position. FIG. 13 a, b are representations of two modifications of the closing and tensioning devices 41 and with small modification also the tensioning device 38.

The first modification according to FIG. 13a is for instance shown on the thigh part 39, which is placed about a schematically shown thigh 44. A first zip fastener 45 opens the thigh part 39 fully down its length. A second zip fastener 46 is joined to this by an elastic textile band 47 and bridges an insert 48.

For putting on the protective suit, the zip fasteners 45, 46 are opened; then the zip fastener 45 is closed. The wearer of the protective suit remains thereby fully mobile. Following the closure of the zip fastener 46 this is already somewhat restricted and after the closure of a third zip fastener 49a, b it is further reduced. The mobility is sufficient for the piloting of an aircraft, but however not for walking. A fourth zip fastener 50, which bridges a further insert 51, is then drawn closed and distributes the fluid 9 in the hollow spaces 5 upwards. A velcro fastener 52 serves—before the closure of all the zip fasteners 45, 46, 49, 50—to match the protective suit to the requirements of the wearer at the moment.

The modification according to FIG. 13b has, instead of the zip fastener 50 and insert 51, a—in this case pneumatic—structure, analog to the skin 4 and is provided as a tensioning element 54. Following the closure of zip fastener 49, the tensioning element 54 is inflated from the on-board compressed air system to a predetermined pressure, therefore shortens and tensions, as provided, the thigh part, analog to that described with regard to FIG. 10.

FIG. 15 shows a detail according to the invention. Here the lower leg part 40 is continued as a strap 53, which is similarly filed with fluid and constructed as a skin 4. This strap 53 is positioned in the flying boot—not shown and made fast with its laces. With the acceleration dependent pressure and volume increase in the strap 53 the circulation tension in the flying boots also increases and thereby restricts the blood flow in the veins of the foot.

As opposed to the example of construction in FIG. 11, 12 the advantage lies in the relatively large saving of weight. This is however bought at the expense of the knees, seat and possibly and most importantly the lower arms remaining uncovered. This can however be answered, since the veins in the seat and knees are covered by relatively strong layers of musculature and/or connective tissue.

What is claimed is:

1. A suit for protection against acceleration forces, the suit comprising:
   double walls forming hollow spaces filled with a fluid;
   wherein, under accelerations ≠1 g in a momentary and local Z-axis, a compensating outer force Corresponding to an internal force on a wearer is built up in the fluid;
   a double walled skin including an elastic, fluid tight material;
   wherein the double walled skin includes a wall outermost from the wearer and a wall nearest to the wearer;
   wherein said two walls arm joined together at connection positions, whereby hollow spaces occur between said walls of the double walled skin;
   wherein the double walled skin Includes an outer skin of low extensible textile surrounding an inner double walled skin, the inner double walled skin together with the outer skin being adapted to surround a large part of a body of the wearer;
   an additional layer in the form of a lining said lining lying between the double walled skin and the body of the wearer and being joined at least partly to the outer skin, whereby the hollow spaces form a continuous fluid column, the inner wall of the double skin exerts a pressure corresponding to the height of the fluid column and the effective acceleration in the momentary and local Z-axis on the body of the wearer, in the inner skin a tension force is built up by this pressure, said tension force being transmitted onto the pans of the body not covered by the double walled skin and is adapted to build up a pressure there corresponding to the tension force;

wherein connection positions bordering the hollow spaces are arranged such that deformation effected by the pressure of the fluid existing in the hollow spaces causes the double walled skin to lie on the body of the wearer without folds;

means for closing the outer skin means for matching the outer skin to a momentary bodily situation of the wearer; and means for tensioning the outer skin of the suit.

2. The suit of claim 1, wherein the connection positions are produced by gluing.

3. The suit of claim 1, wherein the connection positions are produced by welding.

4. The suit of claim 1, wherein the connection positions are produced by sewing and sealing.

5. The suit of claim 1:

wherein the suit covers essentially the whole body with the exception of the neck, head, hands and feet; and wherein the suit comprises a thorax part, a front part, a back part, a plurality of armlets, and a plurality of leg pats the plurality of leg parts comprising a plurality of thigh parts and a plurality of lower leg parts.

6. The suit of claim 1, wherein the suit covers only the entire back and the legs of the wearer.

7. The suit of claim 1, where:

the suit covers only the upper body, the upper body including the stomach/abdominal region, via an upper pan, and the lower legs via a thigh part and a lower leg par;

arms seat and knees are left free; and body regions left free are covered at least in part by elastic textile bands;

the elastic textile bands join the suit and include connect elements adapted to permit the fluid column to extend over an entire height of the suit.

8. The suit of any one of claims 5, 6 or 7, wherein the hollow spaces and the connection positions dividing the hollow spaces extend over the entire suit and only the places where the means for matching and closing arc positioned are excluded therefrom.

9. The suit of any one of claims 5, 6 or 7, wherein:

the individual connection positions lie essentially on lines parallel to each other; and the separation between the connection positions lying on a single line correspond to their lateral separation.

10. The suit of any one of claims 5, 6 or 7, wherein:

the connection positions are in straight lines that run essentially parallel to each other and whose length corresponds to their lateral separation;

the individual connection positions lie essentially on two groups of parallel lines that are displaced by half the lateral separation of two adjacent connection positions; and the separations of the connection positions lying on an individual line substantially correspond to their doubled lateral separation.

11. The suit of any one of claims 5, 6 or 7, wherein the individual connection positions are straight lines that are arranged essentially radially about a point, and the connection positions are adapted to be applied where a basket shaped deformation of the interconnected walls outermost from the wearer and nearest to the wearer is to be effected.

12. The suit of claims 5, 6 or 7, wherein the means for closing comprise zip fasteners.

13. The suit of claim 5 or 6, wherein:

the suit comprises flaps that are provided with hook-and-loop fasteners; and the suit is adapted to be dosed by the flaps running over the shoulders.

14. The suit of claim 5 or 6, wherein:

the means for tensioning the outer sin comprise a plurality of zip fasteners that are in each case joined by their two halves each to the outer skin and to an insert;

the insert, on closing, bridges the zip fasteners; and the outer skin is tensioned by the closure of said plurality of zip fasteners.

15. The suit of claims 5, 6 or 7, wherein:

the means for tensioning the outer skin comprise a plurality of zip fasteners that are in each case joined by their two halves each to the outer skin and to an insert;

the insert, on closing, bridges the zip fasteners;

the skin is tensioned by the closure of the zip fasteners; and the means for tensioning the outer skin further comprise long bladders extending over the whole length of the zip fasteners;

the plurality of zip fasteners are arranged in the area of force of the zip fasteners;

said long bladders, when inflated with compressed air, are adapted to shorten in the lateral direction and to impart the predetermined tension to the outer skin.

16. The suit of any one of claims 5, 6 or 7, wherein:

the suit comprises flaps that are provided with hook-and-loop fasteners;

the suit is adapted to be closed by the flaps running over the shoulders;

the outer skin and the lining are made from a low stretch material;

the upper part, the thigh par and lower leg part can each be closed using their own first zip fasteners;

the upper part, the thigh part, and the lower leg part each have tensioning devices; and the outer skin and the lining are each held together and fastened to one half of the zip fastener.

17. The suit of any one of claims 5, 6 or 7, wherein:

the suit comprises flaps that are provided with hook-and-loop fasteners;

the suit is adapted be closed by the flaps running over the shoulders;

the outer skin and the lining are made from a low stretch material;

the upper par, the thigh part, and lower leg part are adapted each be closed using their own first zip fasteners;

the upper part the thigh part and lower leg part each have tensioning devices;

the outer skin and the lining are each held together and fastened to one half of the zip fastener;

the outer skin and the lining on the upper part are also held together and fastened to the other half of the first zip fastener; and the tensioning devices for the upper part are arranged under the armpits.

18. The suit of claim 16, wherein the tensioning devices comprise two first and second zip fasteners running alongside each other, of which one half of each is joined by means of a textile band extending over its entire length each joined at one side to the outer skin and the lining, joined together, further comprising an elastic textile band extending over their entire length inserted between the first and the second zip fasteners, the second zip fastens are each bridged by a textile insert, one side of the outer skin and the lining, joined together, is further fastened to one half of a third zip fastener, whose other half is joined by a textile band to one half of a fourth zip fastener, which for its part is bridged by a textile insert, the other half of the fourth zip fastener is connected to a textile band, extending over its entire length, which carries a hook-and-loop fastener, extending over its entire length, whose other side is fastened to the outer skin, whereby a closing process begins with closure of the first zip fastener and then of the second zip fastener, is continued with closing of the third zip fastener and a final tensioning is built up by closure of the fourth zip fastener, under the precondition that the hook-and-loop fastener is fixed at a start in a correct position.

19. The suit of claim 17, wherein the tensioning devices comprise two first and second zip fasteners running alongside each other, of which one half of each is joined by means of a textile band extending over its entire length each Joined at one side to the outer skin and the lining joined together, an elastic textile band extending over their entire length is inserted between the first and the second zip fasteners, the second zip fasteners are each bridged by a textile insert one side of the outer skin and the lining, joined together, is further fastened to one half of a third zip fastener, whose other half is joined by a textile band to one half of a fourth zip fastener, which for its part is bridged by a textile insert, the other half of the fourth zip fastener is connected to a textile band, extending over its entire length, which carries a hook-and-loop fastener, extending over its entire length, whose other side i fastened to the outer skin, whereby a closing process begins with closure of the first zip fastener and the of the second zip fastener, is continued with closing of the third zip fastener and a final tensioning is built up by closure of the fourth zip fastener, under the precondition that the hook-and-loop fastener is fixed at a start in a correct position.

20. The suit of claim 16, wherein the tensioning devices comprise two first and second zip fasteners, running alongside each other, which are each joined by their one half by means of a textile band, extending over their entire lengths to one side of the outer skin and the fining& joined together, further comprising an elastic textile band, extending over their entire length and inserted between the first and the second zip fasteners, wherein the second zip fastener is bridged by a textile insert, one end of the outer skin and the lining, joined together, is further fastened to one side of a third zip fastener, whose other half is joined by means of a textile band to a pneumatic tensioning element, which extends over its entire length and which, if it is put under pressure, shortens at right angles to its longitudinal axis, the other end of the pneumatic tensioning element is joined to a textile band, extending over Its entire length, which carries a hook-and-loop fastener, extending over its entire length, whose other side is fastened to the outer skin, whereby a closure process beg with closure of the first zip fastener and then with closure of the second zip fastener, is continued with closure of the third zip fastener and a final tensioning by inflation of the pneumatic tensioning element, with the precondition that the hook-and-loop fastener has already been fixed in a correct position at the beginning of the closure process.

21. The suit of claim 17, wherein the tensioning devices comprise two first and second zip fasteners, running alongside each other, which are each joined by their one half by means of a textile band, extending over their entire lengths, to one side of the outer skin and the lining, joined together, further comprising an elastic textile band, extending over their entire length and inserted between the first and the second zip fasteners, wherein the second zip fastener is bridged by a textile inert, one end of the outer skin and the lining joined together, is further fastened to one side of a third zip fastener; whose other half is joined by means of a textile band to a pneumatic tensioning element which extends over its entire length and which, if it is put under pressure, shortens at right angles to its longitudinal axis, the other end of the pneumatic tensioning element is joined to a textile band, extending over its entire length, which carries a hook-and-loop fastener, extending over its entire length, whose other side is fastened to the outer skin, whereby a closure process begins with a closure of the first zip fastener and then with closure of the second zip fastener, is continued with closure of the third zip fastener and final tensioning by inflation of the pneumatic tensioning element, with the precondition that the hook-and-loop fastener has already been fixed in a correct position at the beginning of the closure process.

22. The suit of claim 18, wherein the tensioning devices for the upper part and the thigh part and the lower leg part are produced identically.

23. The suit of claim 19, wherein the tensioning devices for the upper part and the thigh part and the lower leg part are produced identically.

24. The suit of claim 20, wherein the tensioning devices for the upper part and the thigh part and the lower leg part are produced identically.

25. The suit of claim 21, wherein the tensioning devices for the upper part and the thigh part and the lower leg part are produced identically.

26. The suit of claim 18, wherein the tensioning devices for the upper part and thigh part and lower leg part are produced differently.

27. The suit of claim 19, wherein the tensioning devices for the upper part and thigh part and lower leg part are produced differently.

28. The suit of claim 20, wherein the tensioning devices for the upper part and thigh part and lower log part are produced differently.

29. The suit of claim 21, wherein the tensioning devices for the upper part and thigh part and lower leg part are produced differently.

30. The suit of claim 6 or 7, comprising a pressure sleeve, carried on the lower arm towards the wrist and fastened to a textile armlet, having a reservoir, similarly fixed to the armlet, for the fluid, wherein the armlet is fastened to the upper part by means of an elastic insert.

31. The suit of claim 30, wherein both the pressure sleeve and the reservoir each have a valve for filling and ventilation.

32. The suit of claim 5 or 6, wherein the suit has at least two valves at each of the lowest and highest places for flying with fluid and ventilation.

33. The suit of claim 5, wherein the armlets each have at least two valves for filling with fluid and ventilation.

34. The suit of claim 5, wherein the armlets are joined to the thorax part of the suit by elastic inserts.

35. The suit of claim 5 or 6, wherein the parts of the suit covering the lower legs are each continued in a strap, comprising walls connected each other, and wherein the straps are introduced into a shoe covering the rest of the foot and are adapted to be tightened there, whereby a compensating pressure proportional to the acceleration is built up on the veins of the foot.

* * * * *

UNITED STATES PATENT AND TRADEMARK OFFICE
CERTIFICATE OF CORRECTION

PATENT NO. : 6,450,944 B1
DATED : September 17, 2002
INVENTOR(S) : Andreas Reinhard It is certified that error appears in the above-identified patent and that said Letters Patent is hereby corrected as shown below:

Column 1,
Line 2, insert -- BACKGROUND OF THE INVENTION
              TECHNICAL FIELD --
Lines 5-6, delete ", in accordance with the preamble to claim 1"
Line 7, insert -- HISTORY OF RELATED ART --
Line 57, insert -- SUMMARY OF INVENTION --

Column 2,
Line 4, insert -- BRIEF DESCRIPTION OF DRAWINGS --
Line 9, replace "b" with -- Fig. 2b --
Line 10, replace "c" with -- Fig. 2c --
Line 11, replace "d" with -- Fig. 2d --
Line 16, replace "b" with -- Fig. 5b --
Line 37, replace "b" with -- Fig. 13b --
Line 42, insert -- DETAILED DESCRIPTION OF EXEMPLARY EMBODIMENTS
              OF THE INVENTION --
Line 59, replace "FIGS. 2a,b,c,d" with -- Figs. 2a-2d --
Line 65, replace "AA" with -- 2b-2b --

Column 3,
Line 3, replace "BB" with -- 2c-2c --
Line 18, replace "b" with -- 5b --
Line 53, replace "FIGS. 5a, b" with -- Figs. 5a-5b --

Column 4,
Line 11, replace "FIGS. 5a, b" with -- Figs. 5a-5b --

Column 5,
Line 1, replace "FIGS. 9a, b, c" with -- Figs. 9a-9c --
Line 4, after "AA" insert -- of FIG. 8 --
Line 20, after "BB" insert -- of Fig. 8 --
Line 59, replace "FIGS. 13a, b" with -- Figs. 13a-13b --

UNITED STATES PATENT AND TRADEMARK OFFICE
CERTIFICATE OF CORRECTION

PATENT NO. : 6,450,944 B1
DATED : September 17, 2002
INVENTOR(S) : Andreas Reinhard It is certified that error appears in the above-identified patent and that said Letters Patent is hereby corrected as shown below:

<u>Column 6,</u>
Lines 1-2, replace "FIGS. 13a, b" with -- Figs. 13a-13b --
Line 19, replace "velcro" with -- hook-and-loop --
Line 51, replace "force Corresponding" with -- force corresponding --
Line 57, replace "walls arm" with -- walls are --
Line 61, replace "skin Includes" with -- skin includes --
Line 65, replace "of a lining" with -- of a lining, --

<u>Column 7,</u>
Line 7, replace "the pans of" with -- the parts of --
Line 16, replace "the outer skin" with -- the outer skin; --
Lines 30-31, replace "leg pats" with -- leg parts, --
Line 53, replace "where:" with -- wherein: --
Line 38, replace "pan," with -- part, --
Line 39, replace "par;" with -- part; --
Line 43, replace "include connect" with -- include connecting --
Line 49, replace "closing arc" with -- closing are --

<u>Column 8,</u>
Line 11, replace "be dosed by the" with -- be closed by the --
Line 15, replace "outer sin comprise" with -- outer skin comprise --
Line 44, replace "thigh par" with -- thigh part --
Line 57, replace "upper par," with -- upper part, --

<u>Column 9,</u>
Line 10, replace "zip fastens" with -- zip fasteners --
Line 28, replace "each Joined" with -- each joined --
Line 40, replace "side i fastened" with -- side is fastened --
Line 42, replace "the of the" with -- then of the --
Line 51, replace "the fining&" with -- the lining, --
Line 62, replace "over Its entire" with -- over its entire --
Line 65, replace "process beg with" with -- process begins with --

UNITED STATES PATENT AND TRADEMARK OFFICE
CERTIFICATE OF CORRECTION

PATENT NO. : 6,450,944 B1
DATED : September 17, 2002
INVENTOR(S) : Andreas Reinhard It is certified that error appears in the above-identified patent and that said Letters Patent is hereby corrected as shown below:

Column 10,
Line 13, replace "textile inert," with -- textile insert, --
Line 15, replace "fastener;" with -- fastener, --
Line 50, replace "lower log part" with -- lower leg part --
Line 64, replace "for flying" with -- for filling --

Signed and Sealed this

Eleventh Day of November, 2003

JAMES E. ROGAN
*Director of the United States Patent and Trademark Office*